(12) United States Patent
Doggett et al.

(10) Patent No.: US 11,887,600 B2
(45) Date of Patent: Jan. 30, 2024

(54) TECHNIQUES FOR INTERPRETING SPOKEN INPUT USING NON-VERBAL CUES

(71) Applicant: DISNEY ENTERPRISES, INC., Burbank, CA (US)

(72) Inventors: Erika Doggett, Los Angeles, CA (US); Nathan Nocon, Valencia, CA (US); Ashutosh Modi, Dwarka (IN); Joseph Charles Sengir, San Tan Valley, AZ (US); Maxwell McCoy, Los Angeles, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 118 days.

(21) Appl. No.: 16/593,938

(22) Filed: Oct. 4, 2019

(65) Prior Publication Data

US 2021/0104241 A1  Apr. 8, 2021

(51) Int. Cl.
*G10L 15/25* (2013.01)
*G10L 15/22* (2006.01)
*G10L 15/06* (2013.01)
*G10L 15/26* (2006.01)

(52) U.S. Cl.
CPC .......... *G10L 15/25* (2013.01); *G10L 15/063* (2013.01); *G10L 15/22* (2013.01); *G10L 15/26* (2013.01); *G10L 2015/228* (2013.01)

(58) Field of Classification Search
CPC ........ G10L 15/22; G10L 15/24; G10L 15/26; G10L 15/063; G10L 15/25; G10L 2015/228; G10L 2015/227; G10L 25/63; G06K 9/00302; G06K 9/00315; G06K 9/00335; G06K 9/00355; G06F 3/167; G06F 18/214; G06F 18/2155; G06F 40/169; G06F 40/211; G06F 40/284; G06V 40/176; G06N 20/00

See application file for complete search history.

(56) References Cited

U.S. PATENT DOCUMENTS

| | | | | |
|---|---|---|---|---|
| 10,831,442 | B2* | 11/2020 | Fox | G10L 15/28 |
| 2010/0280983 | A1* | 11/2010 | Cho | G10L 15/22 |
| | | | | 706/46 |
| 2010/0306796 | A1* | 12/2010 | McDonald | G06F 16/70 |
| | | | | 725/32 |
| 2017/0140041 | A1* | 5/2017 | Dotan-Cohen | G06Q 10/101 |
| 2017/0160813 | A1* | 6/2017 | Divakaran | G06K 9/00335 |
| 2018/0232571 | A1* | 8/2018 | Bathiche | G06F 3/167 |
| 2019/0289372 | A1* | 9/2019 | Merler | H04N 21/251 |
| 2020/0380389 | A1* | 12/2020 | Eldeeb | G06F 16/9535 |

* cited by examiner

*Primary Examiner* — Angela A Armstrong
(74) *Attorney, Agent, or Firm* — Artegis Law Group, LLP (57) ABSTRACT

In various embodiments, a communication fusion application enables other software application(s) to interpret spoken user input. In operation, a communication fusion application determines that a prediction is relevant to a text input derived from a spoken input received from a user. Subsequently, the communication fusion application generates a predicted context based on the prediction. The communication fusion application then transmits the predicted context and the text input to the other software application(s). The other software application(s) perform additional action(s) based on the text input and the predicted context. Advantageously, by providing additional, relevant information to the software application(s), the communication fusion application increases the level of understanding during interactions with the user and the overall user experience is improved.

21 Claims, 3 Drawing Sheets

TECHNIQUES FOR INTERPRETING SPOKEN INPUT USING NON-VERBAL CUES

BACKGROUND

Field of the Various Embodiments

The various embodiments relate generally to computer science and natural language understanding and, more specifically, to techniques for interpreting spoken input using non-verbal cues.

Description of the Related Art

To make user interactions with machine-based systems seem more natural to users, some service providers implement chat-based applications within user devices that are designed to allow the devices to communicate verbally with users. Such chat-based applications are commonly referred to as a "chatbots." In a typical user interaction, a speech-to-text model translates spoken input to text input that can include any number of words. The speech-to-text model transmits the text input to the chat-based application, and, in response, the chat-based application generates text output based on the text input. The chat-based application then configures a speech synthesizer to translate the text output to spoken output, which is then transmitted from the device to the user.

One drawback of using chat-based applications is that speech-to-text models usually do not take non-verbal cues into account when translating spoken input to text input. Consequently, in many use cases, chat-based applications are not able to respond properly to user input. More specifically, when speaking, humans oftentimes communicate additional information along with spoken words that impacts how the spoken words should be interpreted. That additional information may include, among other things, intonations, pauses, grunts, laughter, gestures, and facial expressions. For example, a person may communicate a question that has a yes/no answer using a rising intonation, where the pitch of the person's voice rises over time, instead of using an interrogative word (e.g., "what", "who", "where", "how", etc.). By contrast, chat-based applications do not usually interpret an input as a question unless the input includes an explicit interrogative. Thus, a chat-based application can respond incorrectly to spoken input corresponding to a question because the chat-based application interprets the spoken input as a statement instead of question.

Further, non-verbal cues also can provide insight into the emotion of the user which, in turn, can influence the meaning of a spoken input and what the appropriate response should be to that spoken input. For example, a spoken input can have one meaning when a user is being sarcastic and another meaning when the user is being serious. Similarly, the appropriate response to a user that is very frustrated or angry is oftentimes different than what the appropriate response should be to a user that is happy. The inability of conventional chat-based applications to account for the emotional states of users based on the tone of a user's voice and other similar non-verbal user cues can reduce the overall effectiveness of chat-based applications and the overall quality of the user experience.

As the foregoing illustrates, what is needed in the art are techniques that enable chat-based applications to interpret spoken inputs more effectively.

SUMMARY

One embodiment sets forth a computer-implemented method for interpreting spoken user input. The method includes determining that a first prediction is relevant to a first text input that has been derived from a first spoken input received from a user; generating a first predicted context based on the first prediction; and transmitting the first text input and the first predicted context to at least one software application that subsequently performs one or more additional actions based on the first text input and the first predicted context.

At least one technical advantage of the disclosed techniques relative to the prior art is that, with the disclosed techniques, chat-based applications can more effectively interpret spoken user inputs and provide more relevant responses to those spoken user inputs. In that regard, the predicted context enables chat-based applications to take into account non-verbal cues, such as intonation and gestures, when verbally interacting with a user. Notably, the predicted context can provide insight into the emotion of the user that allows chat-based applications to more accurately interpret spoken user inputs and generate more germane responses. By enabling chat-based applications to increase the level of understanding during interactions with users, the overall user experience is improved. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
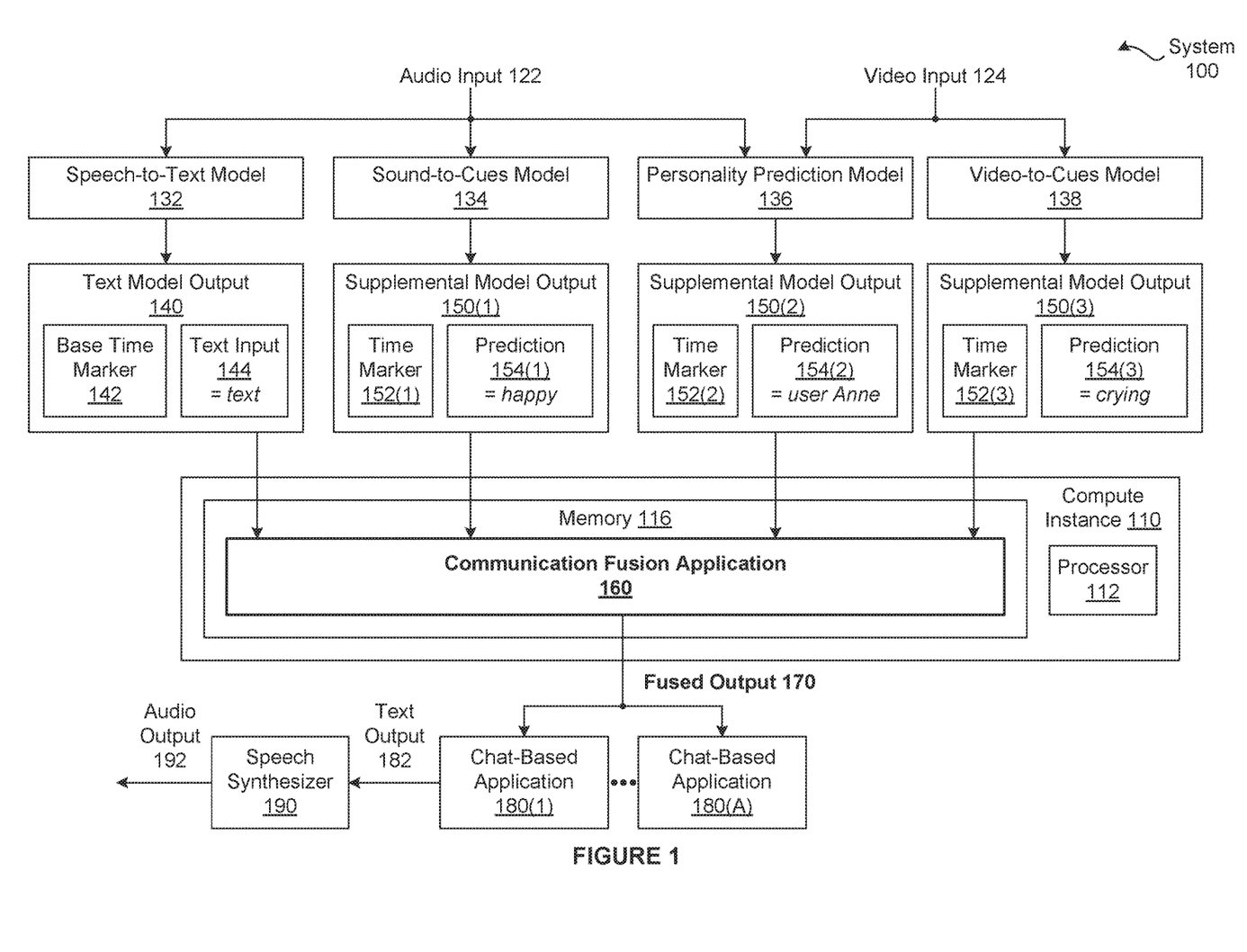
FIG. 1 is a conceptual illustration of a system configured to implement one or more aspects of the various embodiments.

FIG. 1 is a conceptual illustration of a system 100 configured to implement one or more aspects of the various embodiments. As shown, the system 100 includes, without limitation, a compute instance 110, any number of chat-based applications 180, a speech-to-text model 132, a sound-to-cues model 134, a personality prediction model 136, a video-to-cues model 138, and a speech synthesizer 190. In alternate embodiments, the system 100 may include any number of compute instances 110, and any number of speech synthesizers 190. In the same or other alternate embodiments, the system 100 may include any number and type of software applications instead or in addition to any number of the sound-to-cues model 134, the personality prediction model 136, and the video-to-cues model 138. For explanatory purposes, multiple instances of like objects are denoted with reference numbers identifying the object and parenthetical numbers identifying the instance where needed.

Any number of the components of the system 100 may be distributed across multiple geographic locations. In alternate embodiments, any portion of any number of the components of the system 100 may be implemented across any number and type of cloud computing environments (i.e., encapsulated shared resources, software, data, etc.) and any number of distributed computing environments in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a Digital Signal Processor ("DSP"), a micro-controller ("MCU"), a Neural Processing Unit ("NPU"), a state machine, or any combination thereof. The memory 116 stores content, such as software applications and data, for use by the processor 112 of the compute instance 110. In alternate embodiments, any number of compute instances 110 may include any number of processors 112 and any number of memories 116 in any combination. In particular, any number of compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory ("CD-ROM"), an optical storage device, a magnetic storage device, or any suitable combination of the foregoing.

In general, the compute instance 110 is configured to implement one or more applications and/or one or more subsystems of applications. For explanatory purposes only, each application is depicted as residing in the memory 116 of a single compute instance 110 and executing on a processor 112 of the single compute instance 110. However, in alternate embodiments, the functionality of each application and each subsystem may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to facilitate interactions conversations) between a user and the chat-based applications 180. In some embodiments, the chat-based applications 180 may reside within user devices that are designed to allow the devices to communicate verbally with users. In some embodiments, the chat-based applications 180 may reside within a system of devices such as any combination of user devices, local servers, and remote servers. A chat-based application 180 may be any type of software application that performs any number and type of operations based, at least in part, on spoken input. Previously, in a typical interaction process, the chat-based application receives text input translated from spoken input, generates text output based on the text input, and causes the text output to be translated to spoken output, which is then transmitted from the associated device to the user.

One drawback of these types of previous interaction processes is that non-verbal cues usually are unaccounted for in the speech-to-text translation process. Consequently, in many use cases, chat-based applications are not able to respond properly to user input. Some types of non-verbal cues, such as using a rising intonation, can provide direct insight into how the spoken words should be interpreted. The same or other types of non-verbal cues, such as a frown, can provide insight into the emotion of the user which, in turn, can influence the meaning of a spoken input and what the appropriate response should be to that spoken input. The inability of chat-based application to account for non-verbal cues using previous interaction processes can reduce the overall effectiveness of chat-based applications and the overall quality of the user experience.

Generating a Predicted Context Based on
Non-Verbal Cues

To improve the overall quality of the user experience, the system 100 includes, without limitation, a communication fusion application 160 that generates a predicted context (not shown in FIG. 1) based, indirectly, on non-verbal cues associated with a user. Each of the chat-based applications 180 may then use the predicted context to more effectively interact with the user. The predicted context includes, without limitation, any number and type of composite predictions (not shown) relevant to interacting with the user. Some examples of a composite prediction are an intention, an emotion, a personality trait, a user identification (e.g., "Mary"), a level of attentiveness, an action, and so forth. Some examples of a predicted context are: "happy", "sad and asking a question," "asking a question," "confused and Paul," "attentive and Mary," "amused, distracted, and extravert," etc.

As shown, the communication fusion application 160 resides in the memory 116 of the compute instance 110 and executes on the processor 112 of the compute instance 110. The communication fusion application 160 may be any type of software application. For instance, in various embodiments, the communication fusion application 160 may be a machine learning model, such as a neural network, that is trained in any technically feasible fashion. In alternate embodiments, the functionality of the communication fusion application 160 may be distributed across number and type of software applications that reside in any number of memories 116 and execute on any number of processors 112 of any number of compute instances 110.

As shown, the communication fusion application 160 receives a text model output 140 from the speech-to-text model 132 and supplemental model outputs 150(1)-150(3) from, respectively, the sound-to-cues model 134, the personality prediction model 136, and the video-to-cues model 138. The speech-to-text model 132 may be any type of software application that implements any number and type of speech recognition algorithms in any technically feasible fashion. For instance, in some embodiments, the speech-to-text model 132 is a trained machine learning model, such as a trained neural network.

As shown, the speech-to-text model 132 generates the text input 144 based on an audio input 122 that conveys sounds made in the proximity of the user. The audio input 122 is a continuous stream of sounds and may be generated in any technically feasible fashion. For instance, in some embodiments, the audio input 122 is generated by one or more microphones. In alternate embodiments, the speech-to-text model 132 may receive any number of audio inputs 122, where each audio input 122 conveys sounds made during a different discrete portion of time. For instance, in some embodiments, the audio input 122 is generated by a sound-activated microphone and the speech-to-text model 132 receives a new audio input 122 representing a new stream of sounds whenever the sound-activated microphone is activated. In some embodiments, a new audio input 122 is initiated by a microphone input wake-up trigger and remains on throughout the duration of an interaction/conversation between users. The audio input 122 is also referred to herein as the "audible input" 122.

The text model output 140 includes, without limitation, a base time marker 142 and a text input 144. The base time marker 142 indicates a time in any technically feasible fashion and format. For instance, in some embodiments, the base time marker 142 may be a Unix timestamp that specifies a total number of seconds. In other embodiments, the base time marker 142 may specify a time and date. In alternate embodiments, the base time marker 142 is replaced with a base time box that includes, without limitation, a start time marker and an end time marker. In alternate embodiments, the text model output 140 omits the base time marker 142 and the communication fusion application 160 may determine the base time marker 142 in any technically feasible fashion. The text input 144 includes, without limitation, any number of words that represent spoken input during a discrete portion of time. A spoken input is also referred to herein as a "spoken user input."

Over time, the speech-to-text model 132 may generate any number of text inputs 144, where each text input 144 is associated with a different discrete portion of time. The speech-to-text model 132 may determine when to generate a new text input 144 based on any criterion and in any technically feasible fashion. For instance, in some embodiments, the speech-to-text model 132 generates a new text input 144 whenever the speech-to-text model 132, based on the audio input 122, determines that the user has completed a sentence. Accordingly, each of the text inputs 144 is associated with a different sentence. In some embodiments, the speech-to-text model 132 generates a new text input 144 for each word that the speech-to-text model 132 identifies in the audio input 122.

For explanatory purposes only, the sound-to-cues model 134, the personality prediction model 136, and the video-to-cues model 138 are collectively referred to herein as "supplementary models." Each of the supplementary models may be any type of software application that generates the supplemental model output 150 based on data that capture action(s) performed by the user. For instance, in some embodiments, each of the supplemental models is a trained machine learning model, such as a trained neural network, that generates the supplemental model output 150 based on the audio input 122 and/or a video input 124.

The video input 124 is a continuous stream of video frames and may be generated in any technically feasible fashion. For instance, in some embodiments, the video input 124 is generated by a 360-degree video camera. In alternate embodiments, one or more of the supplemental models may receive any number of video inputs 124, where each video input 124 includes video frames associated with a different discrete portion of time. For instance, in some embodiments, the video input 124 is generated by a motion-activated video camera that initiates a new video input 124 representing a new stream of video frames whenever the motion-activated video camera is activated. In some embodiments, a new video input 124 is initiated by a microphone input trigger and remains on throughout the duration of an interaction/conversation between users.

Each of the supplemental model outputs 150 includes, without limitation, a time marker 152 and a prediction 154. The time marker 152 indicates a time in any technically feasible fashion and format. For instance, in some embodiments, the time marker 152 may be a Unix timestamp that specify a total number of seconds. In other embodiments, the time marker 152 may specify a time and date. In alternate embodiments, any number of supplemental model outputs 150 may include a time box instead of the time marker 152, where the time box includes, without limitation, a start time marker and an end time marker. In alternate embodiments, any number of supplemental model outputs 150 may omit the time marker 152, and the communication fusion application 160 may determine the time marker(s) 152 in any technically feasible fashion. Each of the supplemental models may determine when to generate a new supplemental model output 150 based on any criterion and in any technically feasible fashion.

Each of the predictions 154 may include any amount and type of data that is associated with non-verbal actions performed by the user. The predictions 154 generated by one supplemental model may vary in any number of ways (content, meaning, format, etc.) from the predictions 154 generated by another supplemental model. For instance, in some embodiments, the sound-to-cues model 134 is a trained machine learning model that outputs the prediction 154 of a classification label for emotion and/or intent. In the same or other embodiments, the personality prediction model 136 is a trained machine learning model that outputs the prediction 154 of a set of classification labels for different personality traits and a corresponding set of probabilities. In some embodiments, the video-to-cues model 138 is a rule-based software application that outputs the prediction 154 of one or more observed actions, such as pacing and wincing.

The sound-to-cues model 134 generates predictions 154 that provide insight into the emotion and/or intent of the user based on non-verbal sounds in the audio input 122. Accordingly, the sound-to-cues model 134 may generate the predictions 154 based on any number of actions performed by the user, such as using a particular tone of voice, mimicking the sound of an animal, making a funny noise, blowing a raspberry, laughing, making a tsk-tsk sound, uttering squeals of delight, grunting, using a rising intonation, using a falling intonation, pausing, stuttering, yelling, etc. The sound-to-cues model 134 may be implemented in any technically feasible fashion.

The personality prediction model 136 generates predictions 154 that provide insight into the personality traits and/or predict the identity of the user based on both the audio input 122 and the video input 124. The personality prediction model 136 may be implemented in any technically feasible fashion. For instance, in some embodiments, the personality prediction model 136 is a composite machine learning model that includes, without limitation, a recurrent neural network ("RNN") that processes the audio input 122 and a convolutional neural network ("CNN") that processes the video input 124.

The video-to-cues model 136 generates predictions 154 that provide insight into the emotion and/or intent of the user based on visual cues captured in the video input 122. In operation, the video-to-cues model 136 may generate the predictions 154 based on any number of actions performed by the user, such as shrugging, sneering, smiling, grimacing, eye movements, pacing back and forth, looking bored, etc. The video-to-cues model 136 may be implemented in any technically feasible fashion.

For explanatory purposes only, exemplary values for the predictions 154 generated by each of the supplemental models are depicted in italics. As shown, the sound-to-cues model 134 generates the prediction 152(1) specifying that the user is happy, the personality prediction model 136 generates the prediction 152(2) identifying the user as Anne, and the video-to-cues model 138 generates the prediction 152(3) specifying that the user is crying. As persons skilled in the art will recognize, in some embodiments, the different supplemental models may generate predictions 154 that are not necessarily compatible (e.g., "sad" and "happy").

Each of the communication fusion application 160, the speech-to-text model 132, the sound-to-cues model 134, the personality prediction model 136, and the video-to-cues model 138 operate independently, in parallel, and asynchronously to each other. Consequently, at any given time, the communication fusion application 160 may receive the text model output 140 from the speech-to-text model 132 and/or any number of supplemental model outputs 150 from any number of the sound-to-cues model 134, the personality prediction model 136, and the video-to-cues model 138. For explanatory purposes, each of the text model outputs 140 and the supplemental model outputs 150 is also referred to herein as a "component output."

Figure 2:
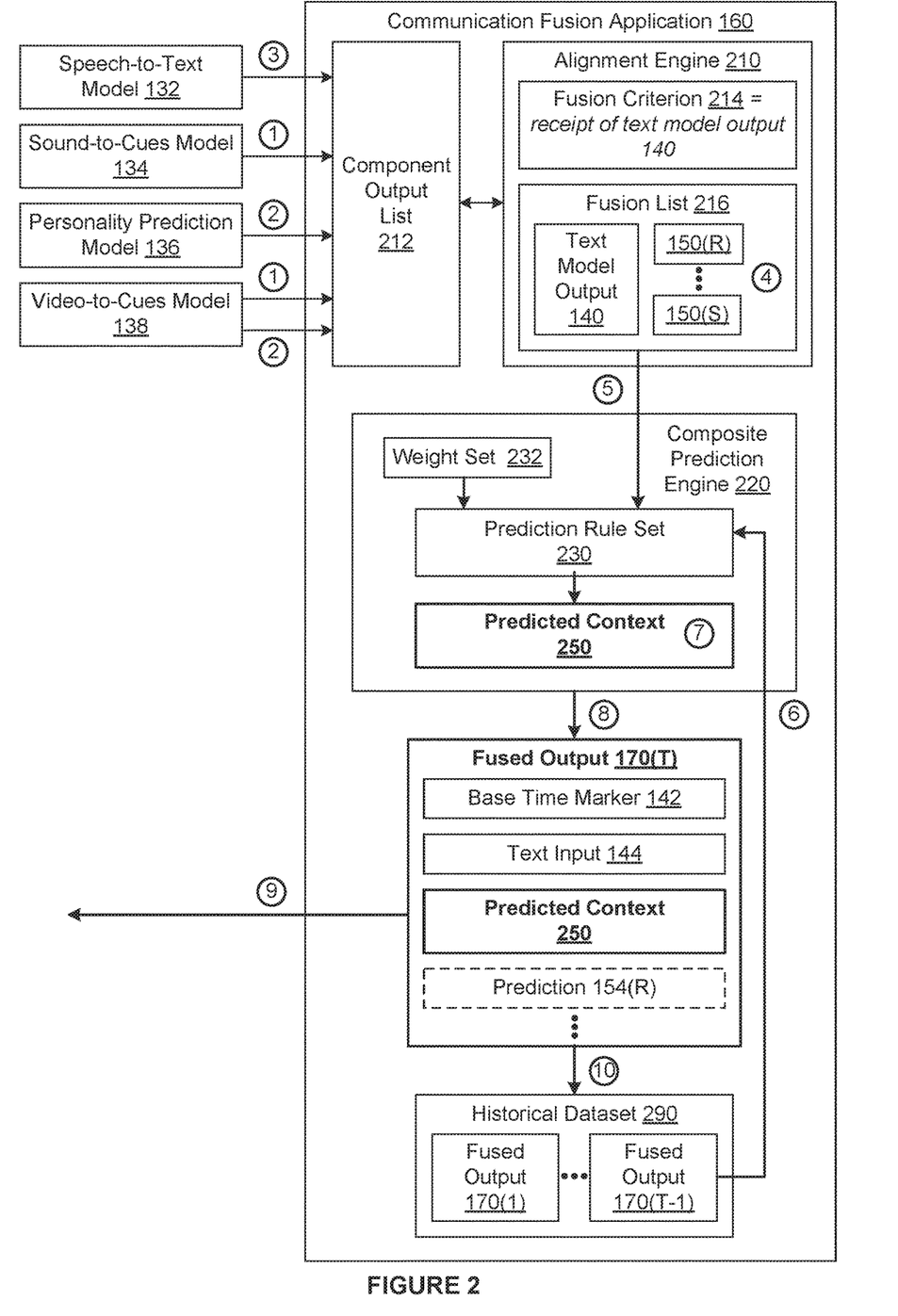
FIG. 2 is a more detailed illustration of the communication fusion application of FIG. 1, according to various embodiments.

As described in greater detail in conjunction with FIG. 2, the communication fusion application 160 generates fused outputs 170 based on the component outputs. As the communication fusion application 160 receives the component outputs, the communication fusion application 160 stores the component outputs in a component output list (not shown in FIG. 1). Upon determining that a fusion criterion (not shown in FIG. 1) has been met, the communication fusion application 160 generates a new fused output 170 that includes, without limitation, a predicted context and any number (including zero) of the text inputs 144. Notably, the communication fusion application 160 continues to receive component outputs while generating the predicted context and the fused output 170. Consequently, the communication fusion application 160 continuously receives new component outputs and intermittently generates a new fused output 170.

The communication fusion application 160 may implement any type of fusion criterion in any technically feasible fashion. For instance, in some embodiments, the fusion criterion is a window duration (e.g., 25 seconds). Accordingly, the communication fusion application 160 generates a new fused output 170 at regular intervals, where the duration of each interval is equal to the window duration. In other embodiments, the fusion criterion is the receipt of the text model output 140 and, as a result, the communication fusion application 160 generates a new fused output 170 at irregular intervals.

For example, at a time A, the communication fusion application 160 could receive and store the supplemental model outputs 150(A) and 150(A+1) from, respectively, the video-to-cues model 138 and the sound-to-cues model 134. Later, at a time B, the communication fusion application 160 could receive and store the supplemental model outputs 150(A+2) and 150(A+3) from, respectively, the video-to-cues model 138 and the personality prediction model 136. At a later time C, the communication fusion application 160 could receive and store the supplemental model output 150(A+4) from the sound-to-cues model 134 and the text model output 140(X) from the speech to text model 132. Upon receiving the text model output 140(X), the communication fusion application 160 could determine that the fusion criterion is met and then generate a new fused output 170 based on the text model output 140(X) and any number of the supplemental model outputs 150(A)-150(A+4).

The communication fusion application 160 generates the predicted context based on one or more of the component outputs stored in the component output list and, optionally, any number of previously generated fused outputs 170. The predicted context includes, without limitation, any amount and type of composite predictions (not shown) relevant to interacting with the user. Each composite prediction may specify any amount and type of information associated with the user. For instance, a composite prediction may specify, without limitation, an intention, an emotion, a personality trait, a user identification (e.g., "Mary"), a level of attentiveness, an action, and so forth. In alternate embodiments, the predicted context may also specify a probability for each of any number of the composite predictions. The communication fusion application 160 may determine each of the composite predictions in any technically feasible fashion. Notably, the communication fusion application 160 may resolve any number of conflicts among the predictions 154 when generating a composite prediction.

As part of generating the predicted context, the communication fusion application 160 removes the component outputs used for generating the predicted context from the component output list. In this fashion, the communication fusion application 160 avoids reusing already considered component outputs when generating subsequent predicted contexts. In alternate embodiments, the communication fusion application 160 may determine which component outputs to remove from the component output list in any technically feasible fashion.

For instance, in some alternate embodiments, the speech-to-text model 132 generates a new text model output 140 for each word in the audio input 122, and the sound-to-cues model 134 generates supplemental model outputs 150 that include time boxes instead of time markers. Further, the communication fusion application 160 is configured to generate the predicted context upon receiving a new text model output 140. The communication fusion application 160 may use each supplemental model output 150 received from the sound-to-cues model 134 to generate the predicted context(s) corresponding to any number of different text model outputs 140. In addition, the communication fusion application 160 may determine when to remove the supplemental model outputs 150 received from the sound-to-cues model 134 from the component output list based on the associated time boxes. For example, if the supplemental model output 150 included the prediction 154 "laughing" and a time box spanning a duration of fifteen seconds, then the communication fusion application 160 could use the prediction 154 "laughing" to determine the predicted context associated with multiple different text model outputs 140 (e.g., a first, second, third, fourth, and fifth word).

The communication fusion application 160 generates the fused output 170 based on the predicted context and the component output list. The fused output 170 includes, without limitation, the predicted context and any amount and type of information that is relevant to interacting with the user. For instance, in some embodiments, the fused output 170 includes, without limitation, the predicted context, one or more text inputs 144 and the associated base time marker(s) 142, and any number of the predictions 154 included in the component output list. The communication fusion application 160 may generate the fused output 170 in any technically feasible fashion and any format. For instance, in some embodiments, the communication fusion application 160 implements one or more trained machine learning models and outputs a file in the JavaScript Object Notation ("JSON") format as the fused output 170.

Although not depicted and for explanatory purposes only, in at least one embodiment, the speech-to-text model 132 generates a new text model output 140 for each word that the speech-to-text model 132 identifies in the audio input 122. The fusion criterion is a window duration of fifteen seconds and, consequently, the communication fusion application 160 is configured to generate a new fused output 170 every fifteen seconds based on the words identified by the speech-to-text model 132 during the preceding fifteen seconds. Suppose that the audio input 122 included the utterance "is a wool sweater scratchy?" during a time interval from 0:10:01 to 0:10:15 and the sound of laughter at 0:10:13. The communication fusion application 160 would sequentially receive the following text model outputs 140 from the speech-to-text model 132: the text model output 140 that included the text input 144 of "is" and the base time marker 142 of 0:10:01, the text model output 140 that included the text input 144 of "a" and the base time marker 142 of 0:10:02, the text model output 140 that included the text input 144 of "wool" and the base time marker 142 of 0:10:03, the text model output 140 that included the text input 144 of "sweater" and the base time marker 142 of 0:10:07, and the text model output 140 that included the text input 144 of "scratchy" and the base time marker 142 of 0:10:11. Subsequently, the communication fusion application 160 would sequentially receive the following supplemental model outputs 150 from the sound-to-cues model 134: the supplemental model output 150 that included the prediction 154 of "rising intonation" and the time marker 152 of 0:10:12 and the supplemental model output 150 that included the prediction 154 of "laughing" and the time marker 152 of 0:10:15. In response, the communication fusion application 160 could generate the fused output 170 that included, without limitation, the base time marker 142 of 0:10:15, the text input 144 "is a wool sweater scratchy" and the predicted context of "asking a question."

After generating the fused output 170, the communication fusion application 160 transmits the fused output 170 to any number of the chat-based applications 180 and then stores the fused output 170 in a historical dataset (not shown in FIG. 1). Each of the chat-based applications 180 may perform any number and type of actions based on the fused output 170. As shown, the chat-based application 180(1) generates a text output 182 based on the fused output 170. The text output 182 includes, without limitation, any number of words. Subsequently, the speech synthesizer 190 translates the text output 182 to speech and transmits the speech to the user as an audio output 192. In this fashion, any number of the chat-based applications 180 may emit a spoken response to a spoken input.

Relative to previous interaction processes for chat-based applications, the communication fusion application 160 enables the chat-based applications 180 to take into account non-verbal cues when verbally interacting with a user. For example, if the user were to communicate a question that has a yes/no answer using a rising intonation instead of using an interrogative, then the communication fusion application 160 could generate the predicted context of "asking a question." The chat-based application 180(1) would then be able to correctly interpret the spoken input as a question instead of a statement. In another example, if the user were yelling and/or making violent gestures, then the communication fusion application 160 could generate the predicted context of "very angry." The chat-based application 180(1) would then be able to perform mitigating actions (e.g., requesting human intervention) instead of performing other actions that could potentially further irritate the user. In yet another example, if the fused output 170 specifies a predicted identity for the user, then the chat-based application 180(1) could tailor responses based on previous interactions with the user to realistically emulate a continuous and consistent relationship.

As persons skilled in the art will recognize, in various embodiments, the historical dataset 290 may be used to re-train any number of machine learning models. For instance, if the communication fusion application 160 is a machine learning model, then the predicted contexts stored in the historical dataset 290 could be used in conjunction with associated ground-truth data to re-train the communication fusion application 160. Similarly, if the historical dataset 290 includes the predictions 154 generated by a machine learning model, then the predictions 154 could be used in conjunction with associated ground-truth data to re-train the machine learning model. In alternate embodiments, any number of the component outputs may be generated by machine learning models that each store any amount and type of historical data that can be used for re-training.

In alternate embodiments, the communication fusion application 160 may receive any number and type of supplemental model outputs 150 from any number and type of software applications. For instance, in some alternate embodiments, the video-to-cues model 138 is replaced with a skeleton-to-cues model and an expression-to-cues model. The skeleton-to-cues model generates the predictions 154 based on the body movements of the user captured in the video input 124, and the expression-to-cues model generates the predictions 154 based on the facial expressions of the user captured in the video input 124. In some alternate embodiments, the communication fusion application 160 may receive supplemental model outputs 150 from a prosody analysis application.

In alternate embodiments, the communication fusion application 160 may receive any amount and type of data from the speech-to-text model 132 and any amount and type of data derived from non-verbal cues from any number and type of software applications in any technically feasible fashion. For instance, in some embodiments, the communication fusion application 160 receives a continuous stream of text data from the speech-to-text model 132, a continuous stream of cue-related data from the video-to-cues model 138, and the sound-to-cues model 134 and the personality prediction model 136 are omitted from the system 100.

In alternate embodiments, the communication fusion application 160 may generate predicted contexts and/or the fused outputs 170 based, at least in part, on cues other than sound and sight. For instance, in alternate embodiments, the communication fusion application 160 may generate predicted contexts based, at least in part, on biometric data. Examples of sensors that could be used to provide biometric data include, without limitation, accelerometers/gyros that enable gesture recognition algorithms (e.g., identifying that an object is held over the shoulder), capacitive touch or pressure sensors that enable detection of interactions (e.g., touching an object, identifying hugs, etc.)

In some alternate embodiments, the communication fusion application 160 may use biometric data to obtain information about engagement and/or emotion when the video analytics implemented in the video-to-cues model 134 are not nuanced enough for micro-emotion detection. In one example, suppose that a child has been interacting with an AI character through a software application and subsequently sees the character in costume at a park. The child could run up to the character and hug the character. The costume could have sensors that generate the prediction 154 that the child is very happy to see the character. The communication fusion application 160 could then use the prediction 154 that the child is very happy to see the character in conjunction with other information, such as the identity of the child generated via image recognition or voice recognition, to generate a predicted context. In another example, a plush doll could lack a camera to provide the video input 124 due to privacy concerns and instead could provide biometric data to the communication fusion application 160.

It will be appreciated that the system 100 shown herein is illustrative and that variations and modifications are possible. Further, the connection topology between the various units in FIG. 1 may be modified as desired. For instance, in alternative embodiments, the communication fusion application 160, the speech-to-text model 132, the sound-to-cues model 134, the personality prediction model 136, and the video-to-cues model 138 may be replaced with a single, multi-task learning model.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

FIG. 2 is a more detailed illustration of the communication fusion application 160 of FIG. 1, according to various embodiments. As shown, the communication fusion application 160 includes, without limitation, a component output list 212, an alignment engine 210, a composite prediction engine 220, the fused output 170(T), and a historical dataset 290.

The component output list 212 stores component outputs (i.e., the text model outputs 140 and the supplemental model outputs 150) for subsequent processing by the alignment engine 210. Initially, the communication fusion application 160 sets the component output list 212 equal to an empty list. As the communication fusion application 160 receives new component outputs, the communication fusion application 160 stores the component outputs in the component output list 212.

Concurrently, the alignment engine 210 evaluates and operates on the component output list 212. The alignment engine 210 includes, without limitation, a fusion criterion 214 and a fusion list 216. When the fusion criterion 214 is satisfied, the alignment engine 210 generates the fusion list 216 that the composite prediction engine 220 subsequently uses to generate the fusion output 170. As depicted in italics, the fusion criterion 214 is the receipt of the text model output 140. Accordingly, when the communication fusion application 160 adds a new text model output 140 to the component output list 212, the alignment engine 210 determines that the fusion criterion 214 is met and generates the fusion list 216.

As shown, the fusion list 216 includes, without limitation, the text model output 140 and any number of supplemental model outputs 150. To generate the fusion list 216, the alignment engine 210 generates an empty list and then copies a subset of the component outputs included in the component output list 212 to the fusion list 216. More precisely, the alignment engine 210 selects the single text model output 140 included in the component output list 212 in addition to the supplemental model outputs 150 included in the component output list 212 that are likely to be relevant to the interpretation of the text model output 140. The alignment engine 210 then copies the selected component outputs to the fusion list 216.

The alignment engine 210 may determine the subset of the supplemental model outputs 150 included in the component output list 212 that are likely to be relevant to the text model output 140 in any technically feasible fashion. For instance, in some embodiments, the alignment engine 210 compares the base time marker 142 included in the text model output 140 to each of the time markers 152 included in the supplemental model outputs 150 stored in the component output list 212. If the time marker 152 is within a "relevance time window" of the base time marker 142, then the communication fusion application 160 determines that the supplemental model output 150 is relevant to the text model output 140.

The alignment engine 210 may determine the relevance time window in any technically feasible fashion. For instance, in some embodiments, the relevance time window is specified via a graphical user interface ("GUI"), not shown. In alternate embodiments, the alignment engine 210 is configured to use different relevance time windows to evaluate the supplemental model outputs 150 generated by different supplemental models. In the same or other embodiments, the alignment engine 210 may perform any number and type of time alignment operations on the base time marker 142 and/or the time markers 152. For instance, in some embodiments, the speech-to-text model 132 does not generate the text model output 144 until the speech-to-text model 132 has determined a complete sentence. Consequently, the text model output 144 can be associated with a significant time duration. Accordingly, the alignment engine 210 may generate a relevance time window that is duration-aligned to the text model output 144.

In alternate embodiments, instead of implementing a relevance time window, the alignment engine 210 determines that any supplemental model output 150 having a time marker 152 that specifies a time earlier than the time specified by the base time marker 142 is relevant to the text model output 140. In the same or other alternate embodiments, the alignment engine 210 evaluates any number of text model outputs 140 to generate each predicted context 250 and performs any number and type of matching operations to determine the supplemental model outputs 150 that are relevant to each text model output 140. For instance, in some embodiments, the alignment engine 210 matches each supplemental model output 150 to the text model output 140 having the base time marker 142 that is closest to and no later than the time marker 152 included in the supplemental model output 150.

After the alignment engine 210 generates the fusion list 216, the alignment engine 210 removes the component outputs that are included in the fusion list 216 from the component output list 212. The alignment engine 210 then transmits the fusion list 216 to the composite prediction engine 220. As shown, the composite prediction engine 220 includes, without limitation, a prediction rule set 230, a weight set 232, and a predicted context 250.

The prediction rule set 230 includes, without limitation, any number and type of rules for computing any number and type of composite predictions (not shown) based on the fusion list 216, the historical dataset 290, and the weight set 232. Each of the composite predictions may specify any amount and type of information relative to interacting with the user. Examples of composite predictions include, without limitation, an intention, an emotion, a personality trait, a user identification (e.g., "Mary"), a level of attentiveness, an action, and so forth. In alternate embodiments, the prediction rule set 230 may include any number of rules for computing a probability for any number of the composite predictions.

The historical dataset 290 includes, without limitation, any number of previously generated fusion outputs 170. The weight set 232 includes, without limitation, any number of weights. In general, each rule specifies a different composite prediction as a function of any number of the predictions 154 included in the fusion list 216, the text input 144 included in the fusion list 216, any number of the previously generated fusion outputs 170 included in the historical dataset 290, and a subset of the weights included in the weight set 232. The subset of previously generated fused outputs 170 that each rule takes into account may be determined in any technically feasible fashion. For instance, in some embodiments, each of the rules is configured by default to take into account the subset of fused outputs 170 generated during the previous five minutes. In the same or other embodiments, the subset of previously generated fused outputs 170 that each rule takes into account may be specified by a developer via a GUI.

In general, the relative contributions of different operands (e.g., the predictions 154, previously generated fused outputs 170, and the text input 144) to different composite predictions are specified via the weight set 232. Oftentimes, when different supplemental models generate conflicting predictions 154, the weight set 232 determines which of the conflicting predictions 154 prevails. For example, if the sound-to-cues model 134 generates the prediction 154 of happy and the video-to-cues model 138 generates the prediction 154 of crying, then the weight set 232 could determine whether a composite prediction for emotion is happy or sad. Notably, any number of weights may be set to zero to indicate that the associated operand(s) (e.g., the text input 144) do not contribute to the associated composite prediction. The weights in the weight set 232 may be specified in any technically feasible fashion (e.g., via a GUI).

In some embodiments, the weights in the weight set 232 may be adjusted over time in any technically feasible fashion to reflect changes in the reliability and/or accuracy of different supplemental models. For example, suppose that the personality prediction model 136 was initially less accurate than the video-to-cues model 138. Further, suppose that after the personality prediction model 136 was retrained based on additional interactions with users, the personality prediction model 136 was more accurate than the video-to-cues model 138. In such a scenario, the weights associated with the predictions 154 generated by the video-to-cues model 138 could initially be relatively high and could subsequently be decreased. By contrast, the weights associated with the predictions 154 generated by the personality prediction model 136 could initially be relatively low and could be subsequently increased.

In alternate embodiments, the composite prediction engine 220 may implement different weight sets 232 for different chat-based applications 180. For example, if the chat-based application 180(x) had no visual component, then the corresponding weight set 232 could specify relatively low weights for the predictions 154 generated by the video-to-cues model 138. In alternate embodiments, the weights in one or more weight sets 232 may be learned using machine learning techniques applied on data collected previously (e.g., during previous executions of the composite prediction engine 220).

After generating the composite predictions based on the prediction rule set 230, the fusion list 216, the historical data 290, and the weight set 232, the composite prediction engine 220 generates the predicted context 250 that includes, without limitation, the composite predictions. In alternative embodiments, the predicted context 250 may include any amount and type of additional information. For instance, in some embodiments, the predicted context 250 also includes any number of probabilities, where each probability is associated with a different composite prediction.

Subsequently, the composite prediction engine 220 generates the fused output 170(T). As shown, the fused output 170(T) includes, without limitation, the predicted context 250, any number (including zero) of the predictions 154 included in the fusion list 216, the base time marker 142 included in the text model output 140, and the text input 144 included in the text model output 140. The communication fusion application 160 then transmits the fused output 170 (T) to any number of the chat-based applications 180 and adds the fused output 170(T) to the historical dataset 290.

In alternate embodiments, the composite prediction engine 220 may compute any number and type of composite predictions and communicate the composite predictions to any number of the chat-based application 180 in any technically feasible fashion. For instance, in some alternate embodiments, the composite prediction engine 220 may use any number and type of heuristics to generate any number of composite predictions. In various alternate embodiments, the composite prediction engine 220 is a trained machine learning model that computes any number of composite predictions. In other alternate embodiments, the composite prediction engine 220 includes multiple trained machine learning models, where each trained machine learning model computes one or more composite predictions.

For explanatory purposes only, a sequence of numbered bubbles depicts operations that the communication fusion application 160 performs to generate the fused output 170 (T). As depicted with the bubbles numbered 1, the communication fusion application 160 concurrently receives a new supplemental model output 150 from the sound-to-cues model 134 and a new supplemental model output 150 from the video-to-cues model 138. The communication fusion application 160 stores the new supplemental model outputs 150 in the component output list 212. Subsequently and as depicted with the bubble numbered 2, the communication fusion application 160 concurrently receives a new supplemental model output 150 from the personality prediction model 136 and a new supplemental model output 150 from the video-to-cues model 138. The communication fusion application 160 stores the new supplemental model outputs 150 in the component output list 212.

As depicted with the bubble numbered 3, the communication fusion application 160 then receives the text model output 140 from the speech-to-text model 132. The communication fusion application 160 stores the text model output 140 in the component output list 212. As a result, the alignment engine 210 determines that the fusion criterion 214 is met and generates the fusion list 216 based on the component output list 212 (depicted with the bubble numbered 4) and updated the component output list 212. As depicted with the bubble numbered 5, the alignment engine 210 transmits the fusion list 216 to the composite prediction engine 220.

As depicted with the bubble numbered 6, the composite prediction engine 220 acquires the historical dataset 290. As depicted with the bubble numbered 7, the composite prediction engine 220 generates the predicted context 250 based on the fusion list 216, the historical dataset 290, and the weight set 232. Subsequently, the composite prediction engine 220 generates the fused output 170(T) based on the predicted context 250 and the fusion list 216 (depicted with the bubble numbered 8). As depicted with the bubble numbered 9, the communication fusion application 160 transmits the fused output 170(T) to the chat-based applications 180. The communication fusion application 160 then adds the fused output 170(T) to the historical dataset 290 (depicted with the bubble numbered 10). In alternate embodiments, to reduce the amount of memory required to store the historical dataset 290 and because the relevance of each fused output 170 decreases over time, the historical dataset 290 is a buffer of size N (where N may be any positive integer). In such embodiments, the communication fusion application 160 stores N or less of the most recently generated fused outputs 170 in the historical dataset 290.

Figure 3:
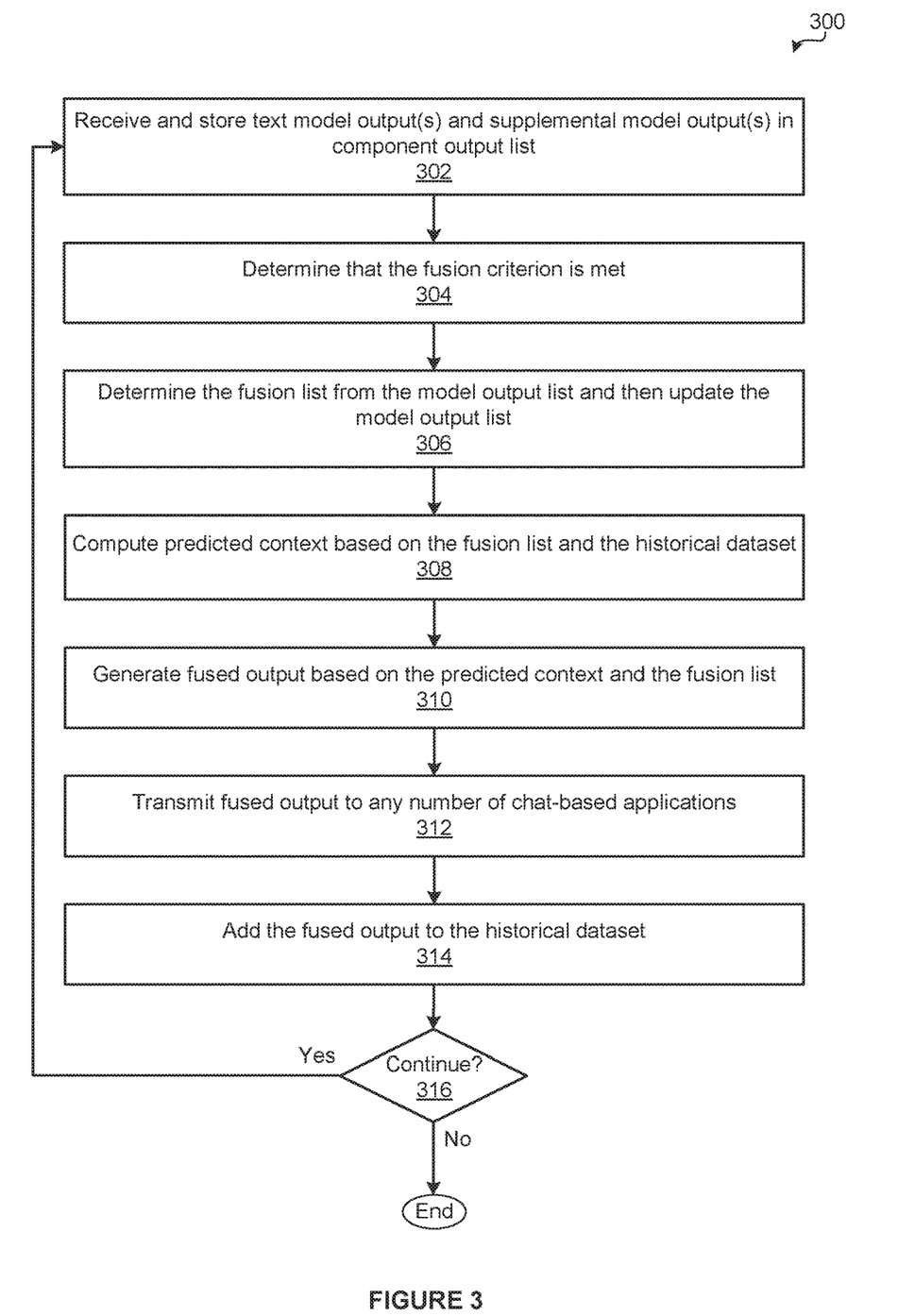
FIG. 3 is a flow diagram of method steps for interpreting spoken user input, according to various embodiments.

FIG. 3 is a flow diagram of method steps for interpreting spoken user input, according to various embodiments. Although the method steps are described with reference to the systems of FIGS. 1-2, persons skilled in the art will understand that any system configured to implement the method steps, in any order, falls within the scope of the various embodiments.

As shown, a method 300 begins at step 302, where the alignment engine 210 receives and stores text model output(s) 140 and supplemental model output(s) 150 in the component output list 212. Importantly, as persons skilled in the art will recognize, at step 302, the alignment engine 210 may receive and store any number of text model outputs 140 and any number of supplemental model outputs 150 from any number and type of models in parallel, sequentially, or any combination thereof.

At step 304, the alignment engine 210 determines that the fusion criterion 214 is met. At step 306, the alignment engine 210 determines the fusion list 216 from the component output list 212 and then updates the component output list 212. At step 308, the composite prediction engine 220 computes the predicted context 250 based on the fusion list 216 and the historical dataset 290. At step 310, the composite prediction engine 220 generates the fused output 170 based on the predicted context 250 and the fusion list 216.

At step 312, the communication fusion application 160 transmits the fused output 170 to any number of chat-based applications 180 for use in interpreting and/or responding to the text input(s) 144. At step 314, the communication fusion application 160 adds the fused output 170 to the historical dataset 290. At step 316, the communication fusion application 160 determines whether to continue executing. The communication fusion application 160 may determine whether to continue executing in any technically feasible fashion. For instance, in some embodiments, the communication fusion application 160 may determine to continue executing until receiving a termination request from a graphical user interface (GUI).

If, at step 316, the communication fusion application 160 determines to continue executing, then the method 300 returns to step 302 where the communication fusion application 160 continues to receive and store any number of new text model outputs 140 and any number of new supplemental model outputs 150 in the component output list 212. If however, at step 316, the communication fusion application 160 determines not to continue executing, then the method 300 terminates.

Importantly, as persons skilled in the art will recognize, the communication fusion application 160 typically executes step 302 continually. Consequently, at any given time, the communication fusion application 160 may be executing step 302 concurrently with any portion of any of the other steps 304-316.

In sum, the disclosed techniques may be used to effectively interpret and respond to spoken input. In some embodiments, a communication fusion application includes, without limitation, an alignment engine and a composite prediction engine. The communication fusion application concurrently and continually receives text model outputs from a speech-to-text model and supplemental model outputs from any number of machine learning models. Each text model output includes, without limitation, a base time marker and text input. Each supplemental model output includes, without limitation, a time marker and a prediction generated by the associated supplemental model.

Continuously and in real-time, the communication fusion application receives and stores text model outputs and supplemental model outputs in a component output list. When the communication fusion application receives a text model output, the alignment engine generates a fusion list based on the component output list. More precisely, the alignment engine compares the base time marker in the text model output to the time markers of each of the supplemental model outputs included in the component output list to identify the subset of the supplemental model outputs that are likely to be relevant to the text input included in the text model output. The alignment engine then adds the identified supplemental model outputs to the component output list.

The composite prediction engine generates a predicted context based on the fusion list and a historical dataset that includes, without limitation, any number of previously generated fused outputs. The predicted context may include any amount and type of predicted data associated with the user. For instance, the predicted context may include an emotion prediction, an intent prediction, a predicted level of attentiveness, and so forth. The communication fusion engine then generates a fused output that includes, without limitation, the base time marker, the text input, and the predicted context. The communication fusion prediction engine transmits the fused output to any number of chat-based applications for use in properly interpreting and responding to the spoken input from which the text input was derived. The communication fusion prediction engine also adds the fused output to the historical dataset.

At least one technical advantage of the disclosed techniques relative to the prior art is that the communication fusion application enables chat-based applications to take into account non-verbal cues, such as intonation and gestures, when verbally interacting with a user. As a result, the chat-based applications can more effectively interpret spoken user inputs and provide more relevant responses to those spoken user inputs. In that regard, the predicted context can provide insight(s) into the intention, emotion, personality, etc., of the user that allow chat-based applications to more accurately interpret spoken user inputs and generate appropriate responses. Furthermore, based on a predicted user identification in the predicted context, chat-based applications can take into account prior interactions with the user to realistically emulate a continuous and consistent relationship. In general, by enabling chat-based applications to increase the level of understanding during interactions with users, the communication fusion application improves the overall user experience. These technical advantages represent one or more technological advancements over prior art approaches.

1. In some embodiments, a computer-implemented method for interpreting spoken user input comprises determining that a first prediction is relevant to a first text input that has been derived from a first spoken input received from a user; generating a first predicted context based on the first prediction; and transmitting the first text input and the first predicted context to at least one software application that subsequently performs one or more additional actions based on the first text input and the first predicted context.

2. The computer-implemented method of clause 1, wherein the first prediction is based on one or more user actions.

3. The computer-implemented method of clauses 1 or 2, wherein the one or more additional actions performed by the at least one software application comprise generating a first text output based on the first text input and the first predicted context.

4. The computer-implemented method of any of clauses 1-3, wherein generating the first predicted context comprises inputting the first prediction and at least one other prediction that is relevant to the first text input into a trained machine learning model that, in response, outputs a composite prediction that is included in the first predicted context.

5. The computer-implemented method of any of clauses 1-4, wherein generating the first predicted context comprises applying one or more rules to the first prediction and at least one other prediction that is relevant to the first text to compute a composite prediction that is included in the first predicted context.

6. The computer-implemented method of any of clauses 1-5, wherein the first predicted context relates to at least one of an intention, an emotion, a personality trait, a user identification, a level of attentiveness, or a user action.

7. The computer-implemented method of any of clauses 1-6, wherein generating the first predicted context comprises computing a composite prediction based on the first prediction and a second prediction, wherein the second prediction predicts at least one of a personality trait or a user identification.

8. The computer-implemented method of any of clauses 1-7, further comprising determining that a second prediction is relevant to a second text input that has been derived from a second spoken input received from the user; generating a second predicted context based on the second prediction and the first predicted context; and transmitting the second text input and the second predicted context to the at least one software application.

9. The computer-implemented method of any of clauses 1-8, wherein determining that the first prediction is relevant to the first text input comprises performing one or more comparison operations between a first time associated with the first prediction and a second time associated with the first text input.

10. The computer-implemented method of any of clauses 1-9, wherein the first prediction is generated by inputting at least one of an audible input associated with the user or a visual input associated with the user into a trained machine-learning model.

11. In some embodiments, one or more non-transitory computer readable media include instructions that, when executed by one or more processors, cause the one or more processors to interpret spoken user input by performing the steps of determining that a first prediction is relevant to a first text input that has been derived from a first spoken input received from a user; generating a first predicted context based on one or more predictions that include the first prediction; and transmitting the first text input and the first predicted context to at least one software application that subsequently performs one or more additional actions based on the first text input and the first predicted context.

12. The one or more non-transitory computer readable media of clause 11, wherein the first prediction is based on at least one of a non-verbal sound, a gesture, or a facial expression.

13. The one or more non-transitory computer readable media of clauses 11 or 12, wherein the one or more additional actions performed by the at least one software application comprise generating a first text output based on the first text input and the first predicted context.

14. The one or more non-transitory computer readable media of any of clauses 11-13, wherein generating the first predicted context comprises inputting the one or more predictions into a trained machine learning model that, in response, outputs a composite prediction that is included in the first predicted context.

15. The one or more non-transitory computer readable media of any of clauses 11-14, wherein the first prediction predicts at least one of an intention, an emotion, a personality trait, a user identification, a level of attentiveness, or a user action.

16. The one or more non-transitory computer readable media of any of clauses 11-15, wherein generating the first predicted context comprises computing a composite prediction based on the first prediction and a second prediction included in the one or more predictions, wherein the second prediction predicts at least one of a personality trait or a user identification.

17. The one or more non-transitory computer readable media of any of clauses 11-16, wherein the second prediction is generated by inputting at least one of an audible input associated with the user or a visual input associated with the user into a trained machine-learning model.

18. The one or more non-transitory computer readable media of any of clauses 11-17, further comprising determining that a second prediction is relevant to a second text input that has been derived from a second spoken input received from the user; generating a second predicted context based on the second prediction and the first predicted context; and transmitting the second text input and the second predicted context to the at least one software application.

19. The one or more non-transitory computer readable media of any of clauses 11-18, wherein determining that the first prediction is relevant to the first text input comprises performing one or more comparison operations between a first time associated with the first prediction and a second time associated with the first text input.

20. In some embodiments, a system comprises one or more memories storing instructions; and one or more processors that are coupled to the one or more memories and, when executing the instructions, are configured to determine that a first prediction is relevant to a first text input that has been derived from a first spoken input received from a user; generating a first predicted context that is relevant to the first text input based on the first prediction; and transmit the first text input and the first predicted context to at least one software application that subsequently performs one or more additional actions based on the first text input and the first predicted context.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for interpreting spoken user input, the method comprising:
    determining a first time marker associated with a first prediction that is generated based on a first type of non-verbal cue and a second time marker associated with a second prediction that is generated based on a second type of non-verbal cue;
    determining that the first time marker and the second time marker fall within a relevance time window associated with a base time marker for a first text input that has been derived from a first spoken input received from a user;
    upon determining that the first time marker and the second time marker fall within the relevance time window, generating a first predicted context based on a function of the first text input, the first prediction, the second prediction, a first weight indicating a relative contribution of the first text input to the first predicted context, a second weight indicating a relative contribution of the first prediction to the first predicted context, and a third weight indicating a relative contribution of the second prediction to the first predicted context; and
    transmitting the first text input and the first predicted context to at least one software application that subsequently performs one or more additional actions based on the first text input and the first predicted context.

2. The computer-implemented method of claim 1, wherein the first prediction is based on one or more user actions.

3. The computer-implemented method of claim 1, wherein the one or more additional actions performed by the at least one software application comprise generating a first text output based on the first text input and the first predicted context.

4. The computer-implemented method of claim 1, wherein generating the first predicted context comprises inputting the first prediction and the second prediction into a trained machine learning model that, in response, outputs a composite prediction that is included in the first predicted context.

5. The computer-implemented method of claim 1, wherein generating the first predicted context comprises applying one or more rules to the first prediction and the second prediction to compute a composite prediction that is included in the first predicted context.

6. The computer-implemented method of claim 1, wherein the first predicted context relates to at least one of an intention, an emotion, a personality trait, a user identification, a level of attentiveness, or a user action.

7. The computer-implemented method of claim 1, wherein generating the first predicted context comprises computing a composite prediction based on the first prediction and the second prediction, wherein the second prediction predicts at least one of a personality trait or a user identification.

8. The computer-implemented method of claim 1, further comprising:
 determining that a third prediction is relevant to a second text input that has been derived from a second spoken input received from the user;
 generating a second predicted context based on the third prediction and the first predicted context; and
 transmitting the second text input and the second predicted context to the at least one software application.

9. The computer-implemented method of claim 1, wherein determining that the first time marker and the second time marker fall within the relevance time window comprises determining the relevance time window based on a prediction type associated with the first prediction.

10. The computer-implemented method of claim 1, wherein the first prediction is generated by inputting at least one of an audible input associated with the user or a visual input associated with the user into a trained machine-learning model.

11. The computer-implemented method of claim 1, further comprising generating a fused output that includes the first text input, the base time marker, and the first predicted context, wherein transmitting the first text input and the first predicted context comprises transmitting the fused output to the at least one software application.

12. One or more non-transitory computer readable media including instructions that, when executed by one or more processors, cause the one or more processors to interpret spoken user input by performing the steps of:
 determining a first time marker associated with a first prediction that is generated based on a first type of non-verbal cue and a second time marker associated with a second prediction that is generated based on a second type of non-verbal cue;
 determining that the first time marker and the second time marker fall within a relevance time window associated with a base time marker for a first text input that has been derived from a first spoken input received from a user;
 upon determining that the first time marker and the second time marker fall within the relevance time window, generating a first predicted context based on a function of the first text input, the first prediction, the second prediction, a first weight indicating a relative contribution of the first text input to the first predicted context, a second weight indicating a relative contribution of the first prediction to the first predicted context, and a third weight indicating a relative contribution of the second prediction to the first predicted context; and
 transmitting the first text input and the first predicted context to at least one software application that subsequently performs one or more additional actions based on the first text input and the first predicted context.

13. The one or more non-transitory computer readable media of claim 12, wherein the first type of non-verbal cue comprises at least one of a non-verbal sound, a gesture, or a facial expression.

14. The one or more non-transitory computer readable media of claim 12, wherein the one or more additional actions performed by the at least one software application comprise generating a first text output based on the first text input and the first predicted context.

15. The one or more non-transitory computer readable media of claim 12, wherein generating the first predicted context comprises inputting the first prediction and the second prediction into a trained machine learning model that, in response, outputs a composite prediction that is included in the first predicted context.

16. The one or more non-transitory computer readable media of claim 12, wherein the first prediction predicts at least one of an intention, an emotion, a personality trait, a user identification, a level of attentiveness, or a user action.

17. The one or more non-transitory computer readable media of claim 12, wherein generating the first predicted context comprises computing a composite prediction based on the first prediction and the second prediction, wherein the second prediction predicts at least one of a personality trait or a user identification.

18. The one or more non-transitory computer readable media of claim 17, wherein the second prediction is generated by inputting at least one of an audible input associated with the user or a visual input associated with the user into a trained machine-learning model.

19. The one or more non-transitory computer readable media of claim 12, wherein the instructions, when executed by the one or more processors, further cause the one or more processors to perform the steps of:
 determining that a third prediction is relevant to a second text input that has been derived from a second spoken input received from the user;
 generating a second predicted context based on the third prediction and the first predicted context; and
 transmitting the second text input and the second predicted context to the at least one software application.

20. The one or more non-transitory computer readable media of claim 12, wherein determining that the first time marker and the second time marker fall within the relevance time window comprises determining the relevance time window based on a prediction type associated with the first prediction.

21. A system, comprising:
 one or more memories storing instructions; and
 one or more processors that are coupled to the one or more memories and, when executing the instructions, are configured to:
  determine a first time marker associated with a first prediction that is generated based on a first type of non-verbal cue and a second time marker associated with a second prediction that is generated based on a second type of non-verbal cue;
  determine that the first time marker and the second time marker fall within a relevance time window associated with a base time marker for a first text input that has been derived from a first spoken input received from a user;
  upon determining that the first time marker and the second time marker fall within the relevance time window, generate a first predicted context based on a function of the first text input, the first prediction, the second prediction, a first weight indicating a relative contribution of the first text input to the first predicted context, a second weight indicating a relative contribution of the first prediction to the first predicted context, and a third weight indicating a relative contribution of the second prediction to the first predicted context; and transmit the first text input and the first predicted context to at least one software application that subsequently performs one or more additional actions based on the first text input and the first predicted context.

* * * * *